United States Patent
Funk et al.

(10) Patent No.: US 12,449,795 B2
(45) Date of Patent: Oct. 21, 2025

(54) METHOD FOR OPERATING AN INDUSTRIAL FACILITY

(71) Applicant: SEW-EURODRIVE GMBH & CO. KG, Bruchsal (DE)

(72) Inventors: Johanna Funk, Ötisheim (DE); Maja Sliskovic, Ettlingen (DE)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 592 days.

(21) Appl. No.: 17/797,240

(22) PCT Filed: Jan. 25, 2021

(86) PCT No.: PCT/EP2021/025027
§ 371 (c)(1),
(2) Date: Aug. 3, 2022

(87) PCT Pub. No.: WO2021/156000
PCT Pub. Date: Aug. 12, 2021

(65) Prior Publication Data
US 2023/0060858 A1  Mar. 2, 2023

(30) Foreign Application Priority Data
Feb. 6, 2020 (DE) .......................... 102020000785.6

(51) Int. Cl.
*G05B 19/4061* (2006.01)
*G05B 19/418* (2006.01)

(52) U.S. Cl.
CPC ... *G05B 19/41895* (2013.01); *G05B 19/4061* (2013.01); *G05B 2219/40506* (2013.01)

(58) Field of Classification Search
CPC .......... G05B 19/41895; G05B 19/4061; G05B 2219/40506; G05D 1/0274
See application file for complete search history.

(56) References Cited

U.S. PATENT DOCUMENTS 6,453,233 B1    9/2002  Kato
11,199,853 B1 * 12/2021 Afrouzi .................. B25J 13/006
(Continued)

FOREIGN PATENT DOCUMENTS

DE    102018002378 A1    10/2018
DE    102018009114 A1    6/2019
(Continued)

OTHER PUBLICATIONS

International Search Report issued in corresponding International Application No. PCT/EP2021/025027 dated Apr. 7, 2021, pp. 1-2, English Translation.
(Continued)

*Primary Examiner* — Dino Kujundzic
(74) *Attorney, Agent, or Firm* — Carter, DeLuca & Farrell LLP

(57) ABSTRACT

In a method for operating an industrial facility which has at least one mobile system, a base map of the industrial facility is generated, which has information about at least one vehicle-accessible region and at least one closed region; a correction map of the industrial facility is generated, which has information about at least one vehicle-accessible region and at last one closed region; the base map is overlaid with the correction map; at least one metric feature of the base map is replaced by a metric feature of the correction map when a difference between a metric feature of the base map and a metric feature of the correction map is detected.

21 Claims, 9 Drawing Sheets

(56) References Cited

U.S. PATENT DOCUMENTS

| | | |
|---|---|---|
| 2004/0122590 A1 | 6/2004 | Ito et al. |
| 2010/0293517 A1 | 11/2010 | Graeve et al. |
| 2018/0003512 A1* | 1/2018 | Lynch .............. G01C 21/3811 |
| 2019/0354106 A1* | 11/2019 | Gupta .............. G05D 1/0212 |
| 2020/0159227 A1* | 5/2020 | Cohen .............. G05D 1/024 |

FOREIGN PATENT DOCUMENTS

| | | |
|---|---|---|
| DE | 102019000903 A1 | 8/2019 |
| DE | 102019001253 A1 | 9/2019 |

OTHER PUBLICATIONS

Portugal, D. et al., "Retrieving Topological Information for Mobile Robots Provided with Grid Maps" Communications in Computer and Information Science (Jan. 2013) pp. 204-217, vol. 358.

Cordella, L.P. et al., "A (Sub)Graph Isomorphism Algorithm for Matching Large Graphs" IEEE Transactions on Pattern Analysis and Machine Intelligence (Oct. 2004) pp. 1367-1372, vol. 26, No. 10.

Linke, J. et al., "The influence of patch-delineation mismatches on multi-temporal landscape pattern analysis" Landscape Ecology (Nov. 2008) pp. 157-170, vol. 24, No. 2.

International Report on Patentability issued in corresponding International Application No. PCT/EP2021/025027 dated Jul. 28, 2022, pp. 1-7, English Translation.

* cited by examiner

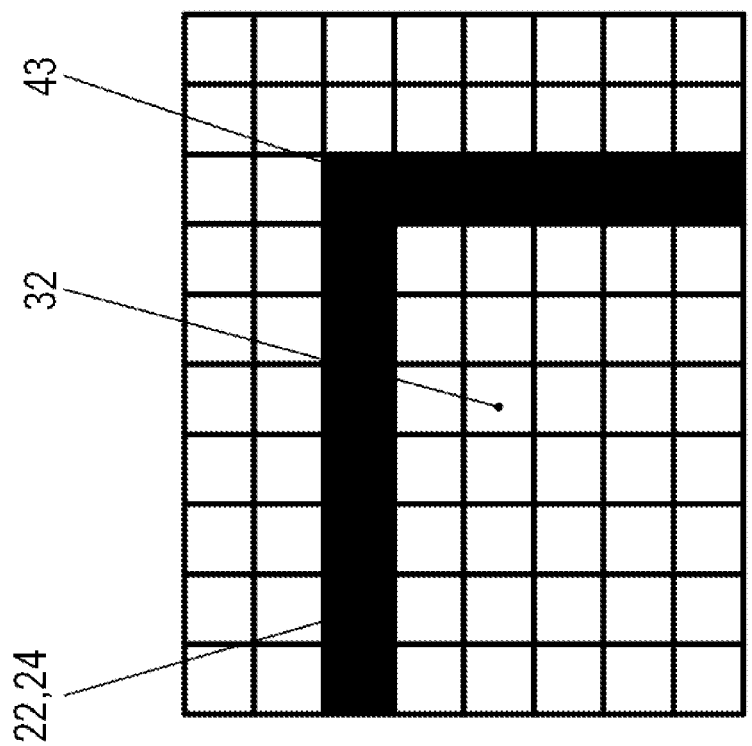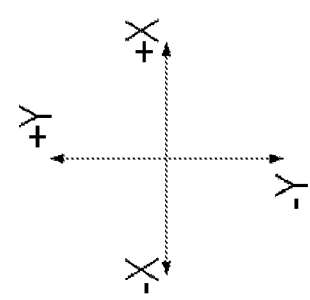

METHOD FOR OPERATING AN INDUSTRIAL FACILITY

FIELD OF THE INVENTION

The present invention relates to a method for operating an industrial facility, e.g., which has at least one mobile system, in which a map of the industrial facility is generated, which has information about at least one vehicle-accessible region and at least one closed region.

The industrial facility is, for example, an industrial application, for example, a production plant. The mobile system of the industrial facility is, for example, an autonomously driving vehicle. The mobile system is used, for example, for transporting objects within the industrial facility. A map of the industrial facility is prepared, which has information about regions that are accessible to the mobile system and regions that are closed to the mobile system. The vehicle-accessible regions of the industrial facility include routes on which the mobile system can move.

BACKGROUND INFORMATION

German Patent Document No. 10 2019 001 253 describes a method for operating an industrial facility which has at least one mobile system which can be moved on a circulation area of the industrial facility. With the help of appropriate sensors, the mobile system acquires objects in the industrial facility. The positions of the objects thus detected are compared to assumed positions of objects according to a map of the industrial facility.

Additional methods for operating industrial facilities with mobile systems, in which charts or maps of the industrial facility are prepared, are described in German Patent Document No. 10 2018 002 378, German Patent Document No. 10 2018 009 114, and German Patent Document No. 10 2019 000 903, for example.

U.S. Patent Application Publication No. 2010/0293517 describes a method for forming a graph structure for describing an area with a free area and an occupied area. The graph structure is formed from a point of a topological graph structure and from location information of a closest occupied area point.

The article "PORTUGAL, David ROCHA, Rui P.: Retrieving Topological Information for Mobile Robots Provided with Grid Maps. In: Filipe J., Fred A. (eds) Agents and Artificial Intelligence. ICAART2012. Communications in Computer and Information Science, Bd. 358, 2013, Springer, Berlin, Heidelberg," URL: https://doi.org/10.1007/978-3-642-36907-0 14, describes a method for extracting topological maps for mobile robots.

The article "GORDELLA, Luigi P. [et al]: A (sub)graph isomorphism algorithm for matching large graphs. In IEEE Transactions on Pattern Analysis and Machine Intelligence, Bd. 26, 2004, H. 10, S. 1367-1372, 001: 10.1109/TPAMl.2004.75," URL: https:llieeexplore,ieee.org/stamp/stamp.jsp?tp=&arnumber=1323804, describes an algorithm for overlaying graphs.

In planning an industrial facility, a base map of the industrial facility is generated generally by a CAD system. The base map has information about regions that are accessible to the mobile system and about regions that are closed to the mobile system, as well as about routes for the mobile systems. It often occurs that the industrial facility is built differently from the plan. For example, immobile objects that represent regions that are closed to the mobile system are established offset from the positions provided for that purpose. Therein, the regions that are actually accessible to the mobile system do not overlap with the vehicle-accessible regions planned using the CAD system.

SUMMARY

Example embodiments of the present invention provide a method for operating an industrial facility. For example, errors in a base map of the industrial facility are to be detected and corrected.

According to an example embodiment of the present invention, a method is described herein for operating an industrial facility, which has at least one mobile system. The industrial facility is, for example, an industrial application, for example, a production plant. The mobile system of the industrial facility is, for example, an autonomously driving vehicle which is used for transporting objects within the industrial facility.

According to the method, a base map of the industrial facility is generated, for example by a CAD system. The base map has information about at least one region which is accessible to the mobile system and at least one region which is closed to the mobile system. Furthermore, a correction map of the industrial facility is generated, which also has information about at least one region accessible to the mobile system and about at least one region closed to the mobile system. The correction map is generated, for example, by a mobile system which acquires immobile objects in the industrial facility by appropriate sensors. It is also possible that the base map is generated by a mobile system which acquires immobile objects in the industrial facility by appropriate sensors. The correction map is generated, e.g., by another mobile system and/or at another time and/or by other sensors, for example, at another level than the base map.

Subsequently, the generated base map is overlaid with the generated correction map. For example, generally, similarities between topological features of the base map and corresponding topological features of the correction map are detected. At least one metric feature of the base map is replaced by a metric feature of the correction map, when a difference between a metric feature of the base map and a metric feature of the correction map is detected.

For example, generally the base map describes a target state of the industrial facility, e.g., target parameters of the routes, whereas the correction map describes an actual state of the industrial facility, e.g., the actual state of the metric map. It is thus assumed that generally the metric features of the correction map are correct. When differences in the metric features between the base map and the correction map are detected, the metric features of the base map are therefore considered to be incorrect.

The correction map on the other hand is generally incomplete and describes only a portion of the industrial facility, corresponding to a section of the base map, and/or it does not contain all the information necessary for operating the industrial facility. Thus, it would not be expedient for operating the industrial facility to replace the entire base map by the correction map.

The method described herein provides for errors in a base map of the industrial facility to be detected and corrected relatively quickly. For example, it is possible to correct the detected metric errors in the base map. For example, a correction of the base map is carried out significantly quicker than if the base map had been manually adjusted by an employee, which is relatively time-consuming. For example, the method described herein is relatively robust.

After application of the method, updated information about the industrial facility is available, which can subsequently be used for navigating the mobile system within the industrial facility. Metric features are, for example, lengths, e.g., distances between points, as well as angles. Metric features are, for example, independent of different scales of different maps.

According to example embodiments, the base map of the industrial facility has information about at least one planned route for the at least one mobile system, and the correction map of the industrial facility has information about at least one planned route for the at least one mobile system. When the base map is overlaid with the correction map, at least one parameter of the at least one planned route of the base map is transferred onto the corresponding planned route of the correction map. Which route in the base map corresponds to which route in the correction map is detected by similarities between the topological features of the base map and corresponding topological features of the correction map.

Thus, it is possible to transfer location-dependent parameters, e.g., the parameters of the routes, relatively quickly into the correction map. For example, a correction of the correction map is carried out significantly more quickly than if the correction map had been adjusted manually by an employee, which is relatively time-consuming.

Parameters of the planned route are, for example, a speed, a distance to be maintained from the objects to the left or right of the mobile system, a mobile system type which is allowed to access this route, time limitations which are valid for this route, e.g., a prohibition of traveling on this route at a certain time or on a certain day of the week, etc.

According to example embodiments, the base map and the correction map are each generated in the form of a graph which describes the at least one vehicle-accessible region in the industrial facility. For example, the graph includes at least a first node point, a second node point and at least one connection between the first node point and the second node point as topological features. The node points as well as the connection thus represent topological features. A connection of the graph between two node points here in each case has a connection direction and a connection length.

Subsequently, the graph of the base map is overlaid with the graph of the correction map. Suitable methods for overlaying of graphs are described, for example, in "An Improved Algorithm for Matching Large Graphs," L. P. Cordella, P. Foggia, C. Sansone, M. Vento as well as in "A (Sub)Graph Isomorphism Algorithm for Matching Large Graphs," Luigi P. Cordella, Pasquale Foggia, Carlo Sansone, and Mario Vento, IEEE TRANSACTIONS ON PATTERN ANALYSIS AND MACHINE INTELLIGENCE, VOL. 26, NO. 10, October 2004. This overlaying of the graph of the base map with the graph of the correction map yields a matching of the node points of the graph of the correction map with the node points of the graph of the base map. For example, the graph of the base map is, for example, a subgraph of the correction map. Thus, accordingly, the method can be used for overlaying the graph of the base map with the subgraph of the correction map. Based on this matching, topological features of the base map, e.g., node points and connections, can be replaced by corresponding topological features of the correction map. Likewise, based on this matching, the location-bound parameters as well as features of the base map can be transferred to the corresponding sites and routes of the correction map.

According to example embodiments, in the overlaying of the graph of the base map with the graph of the correction map, the connections length and the difference of the connection directions between the corresponding node points are used. Thereby, the accuracy in the overlaying of the graph of the base map with the graph of the correction map is, for example, improved. For example, the overlaying is also possible if the base map and the correction map have different orientations, that is to say they are rotated with respect to one another. The method thus becomes rotation invariant and thus more robust.

According to example embodiments, the method includes the following steps:

The correction map and/or the base map is/are initially received in the form of an original grid cell map. The original grid cell map extends in a longitudinal direction and in a transverse direction perpendicular thereto. The longitudinal direction and the transverse direction define a two-dimensional cartesian coordinate system. The original grid cell map has a plurality of individual cells. The cells which describe the at least one vehicle-accessible region are characterized as free, and the cells which describe the at least one closed region are characterized as occupied. Thus, the free cells form at least one free region, and the occupied cells form at least one occupied region.

From the original grid cell map, a reduced grid cell map is generated, in that the cells of the at least one free region of the original grid cell map whose distance in longitudinal direction and/or in transverse direction and/or in a straight line to at least one cell of the at least one occupied region is smaller than a safe distance are characterized as occupied. The safe distance can be selected based on specifiable criteria. For example, a width of the mobile system has to be taken into consideration in the selection of the safe distance.

Subsequently, a thinning of the at least one free region of the reduced grid cell map is carried out in that cells of the at least one free region which in longitudinal direction and/or in transverse direction adjoin at least one occupied region are characterized as occupied, until the at least one free region is in the form of a skeleton which includes at least one linear sequence of individual free cells. A method for thinning a region is described, for example, in "A Fast Parallel Algorithm for Thinning Digital Patterns", T. Y. ZHANG and C. Y. SUEN, Communications of the ACM, March 1984, Volume 27, Number 3.

From the skeleton of the at least one free region thus obtained, the graph of the correction map and/or the graph of the base map is/are subsequently generated.

Alternatively, it is possible, for example, to generate the base map of the industrial facility immediately in the form of a graph. It is also possible to prepare the base map in another form and generate the graph of the base map therefrom.

According to example embodiments, before generating the graph of the correction map and/or of the base map, a smoothing of the skeleton of the at least one free region is carried out in that cells of the at least one occupied region which in longitudinal direction and in transverse direction adjoin at least one free region are characterized as free, until each cell of the free region which in diagonal direction adjoins another fee cell additionally in longitudinal direction or in transverse direction adjoins another free cell which in longitudinal or in transverse direction adjoins said other free cell. The skeleton of the at least one free region thus includes free cells which adjoin one another in longitudinal direction or in transverse direction but not exclusively in diagonal direction.

For example, in the reduced grid cell map, at least one charging point for charging the at least one mobile system is provided. For example, the charging point is an inductive charging coil by which energy can be inductively transferred to a coil of the mobile system. The thinning of the at least one free region of the reduced grid cell map is carried out such that the at least one charging point is part of the skeleton.

According to example embodiments, the graph includes at least one charging point as node point. A charging point thus represents a node point. The graph is generated in that, for each of the charging points, connections to other charging points are acquired. Such a connection includes a sequence of individual free cells between two node points. For each connection detected, in each case a connection direction and a connection length are determined.

According to example embodiments, the graph includes at least one intersection as node point. An intersection thus represents a node point. The graph is generated in that the cells of the at least one free region which in longitudinal direction as well as in transverse direction adjoin at least three other free cells are characterized as intersections. Furthermore, for each of the intersections, connections to other node points are detected. Such a connection includes a sequence of individual free cells between two node points. For each connection detected, in each case a connection direction and a connection length are determined.

According to example embodiments, the graph includes at least one end point as node. An end point thus represents a node point. The graph is generated in that the cells of the at least one free region which in longitudinal direction as well as in transverse direction adjoin exactly one free cell are characterized as end points. Furthermore, for each of the end points, connections to other node points are detected. Such a connection includes a sequence of individual free cells between two node points. For each connection detected, in each case a connection direction and a connection length are determined.

According to example embodiments, the graph includes at least one curve point as node point. A curve point thus represents a node point. The graph is generated in that the cells of the at least one free region which in longitudinal direction adjoin exactly one free cell, in which the free cell is part of a linear sequence of a minimum number of free cells in longitudinal direction, and which in transverse direction adjoin exactly one free cell, in which the free cell is part of a linear sequence of a minimum number of free cells in transverse direction, are characterized as curve points. Furthermore, for each of the curve points, connections to other node points are detected. Such a connection includes a sequence of individual free cells between two node points. For each connection detected, in each case a connection direction and a connection length are determined.

A value of the minimum number can be selected approximately freely. For example, the minimum number of free cells is selected to be between three and seven. For example, the minimum number of free cells is selected to be between four and six. For example, the minimum number of free cells is selected to equal five.

According to example embodiments, a connection also has a connection width. The graph of the correction map and/or of the base map is generated in that, in addition to each connection detected, a respective connection width is determined in that, from each free cell of the connection, on both sides, a respective connection distance, in a direction perpendicular to the connection direction, to the respective closest closed region is determined. A path width, which is calculated as sum of the two determined connection distances, is associated with the free cell. The connection width of the connection is determined as the smallest path width of all the free cells of the connection.

By taking into consideration the connection width of the connection, it can be determined whether the connection can be used by the mobile system. To the extent that multiple mobile systems are present in the industrial facility, it is possible that these mobile systems have different vehicle widths. It is also possible that the mobile systems transport objects having different widths. The connection can be used only by selected mobile systems depending on the determined connection width.

For example, for each connection detected, the respective connection direction is determined in that the principal direction which comes closest to the exact connection direction is associated with the connection direction. Principal directions are a positive longitudinal direction, a negative longitudinal direction, a positive transverse direction as well as a negative transverse direction.

According to example embodiments, the at least one mobile system includes a pick-up for contactless reception of energy, and the industrial facility has at least one charging point for inductive transfer of energy. For example, the pick-up can be inductively coupled to the charging point. The at least one charging point is arranged at a node point. For this purpose, the charging point includes, for example, a primary coil by which energy can be transferred inductively and contactlessly to the pick-up of the mobile system. Thus, an energy storage of the mobile system can be charged, while the mobile system is located at the node point.

According to example embodiments, the at least one mobile system includes a pick-up for contactless reception of energy, and the industrial facility has at least one conductor loop for inductive transfer of energy. The pick-up can be inductively coupled to the conductor loop. The at least one conductor loop is arranged along a connection between two node points. For this purpose, the conductor loop includes, for example, an elongated primary conductor, by which energy can be transferred inductively and contactlessly to the pick-up of the mobile system. Thus, an energy storage of the mobile system can be charged, while the mobile system is moving on the connection between the node points.

Further features and aspects of example embodiments of the present invention are explained in further detail below with reference to the appended schematic Figures.

BRIEF DESCRIPTION OF THE DRAWINGS

FIG. 6 illustrates a section of a skeleton with a curve point.

DETAILED DESCRIPTION

Figure 1:
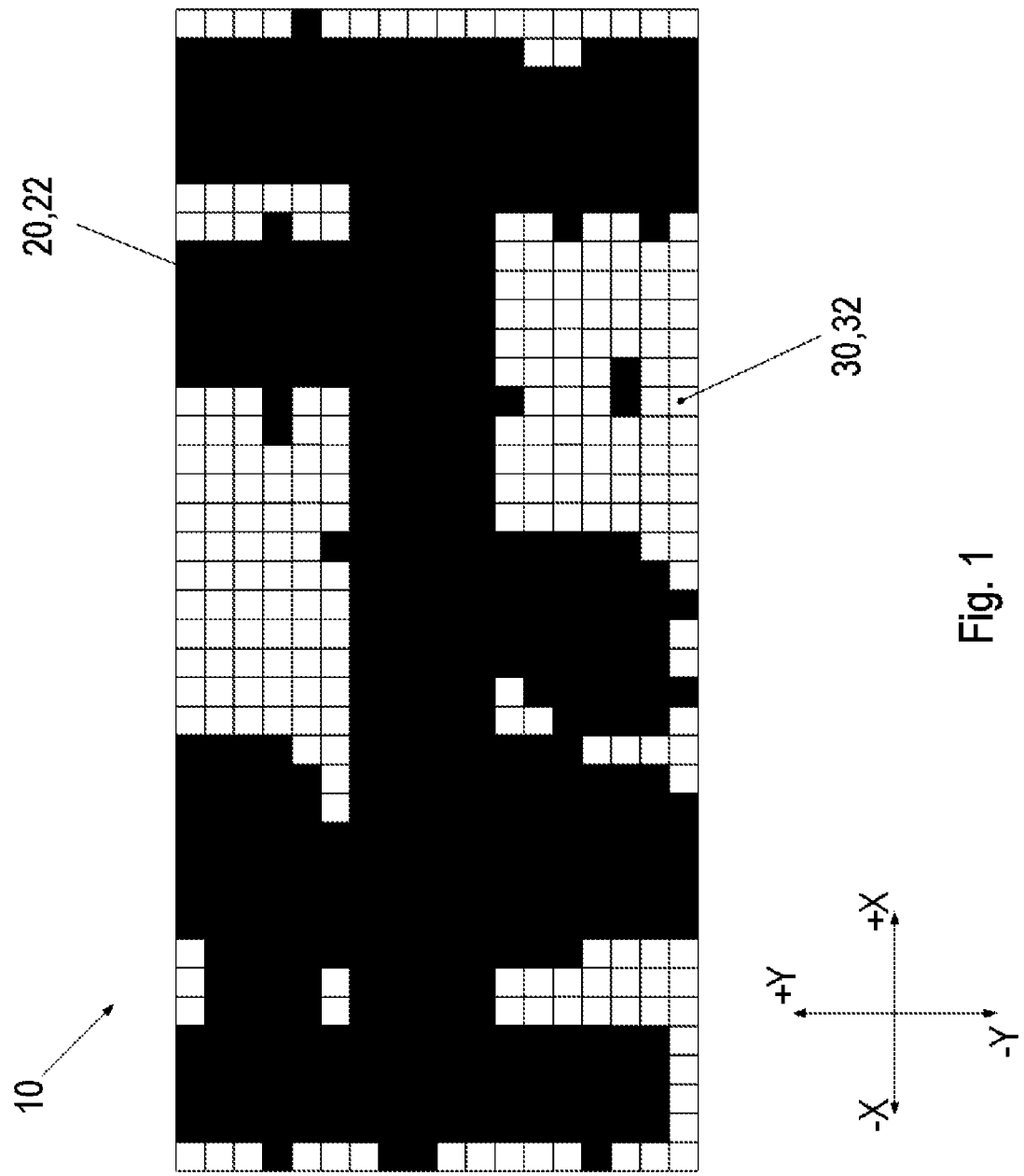
FIG. 1 illustrates a correction map of an industrial facility in the form of an original grid cell map.

FIG. 1 illustrates a correction map of an industrial facility in the form of an original grid cell map 10. The original grid cell map 10 has a two-dimensional configuration and extends in a positive longitudinal direction +X, in a negative longitudinal direction −X antiparallel thereto, in a positive transverse direction +Y perpendicular thereto, and in a negative transverse direction −Y antiparallel thereto. The positive longitudinal direction +X and the negative longitudinal direction −X are also jointly referred to as longitudinal direction X. The positive transverse direction +Y and the negative transverse direction −Y are also jointly referred to as transverse direction Y. The longitudinal direction X and the transverse direction Y thus define a two-dimensional cartesian coordinate system.

The industrial facility is an industrial application, for example, a production plant. The mobile system of the industrial facility is an autonomously driving vehicle. The mobile system is used, e.g., for transporting objects within the industrial facility. The industrial facility has regions 20 which are accessible to the mobile system, for example, empty areas and paths. The industrial facility also has regions 30 which are closed to the mobile system, for example, assembly stations, work benches, or similar objects.

The original grid cell map 10 has a plurality of individual cells which are arranged next to one another in longitudinal direction X as well as in transverse direction Y. Cells which describe a region 20 which is accessible to the mobile system are characterized as free cells. Cells which describe a region 30 which is closed to the mobile system are characterized as occupied. The free cells form a free region 22, and the occupied cells form an occupied region 32.

Figure 2:
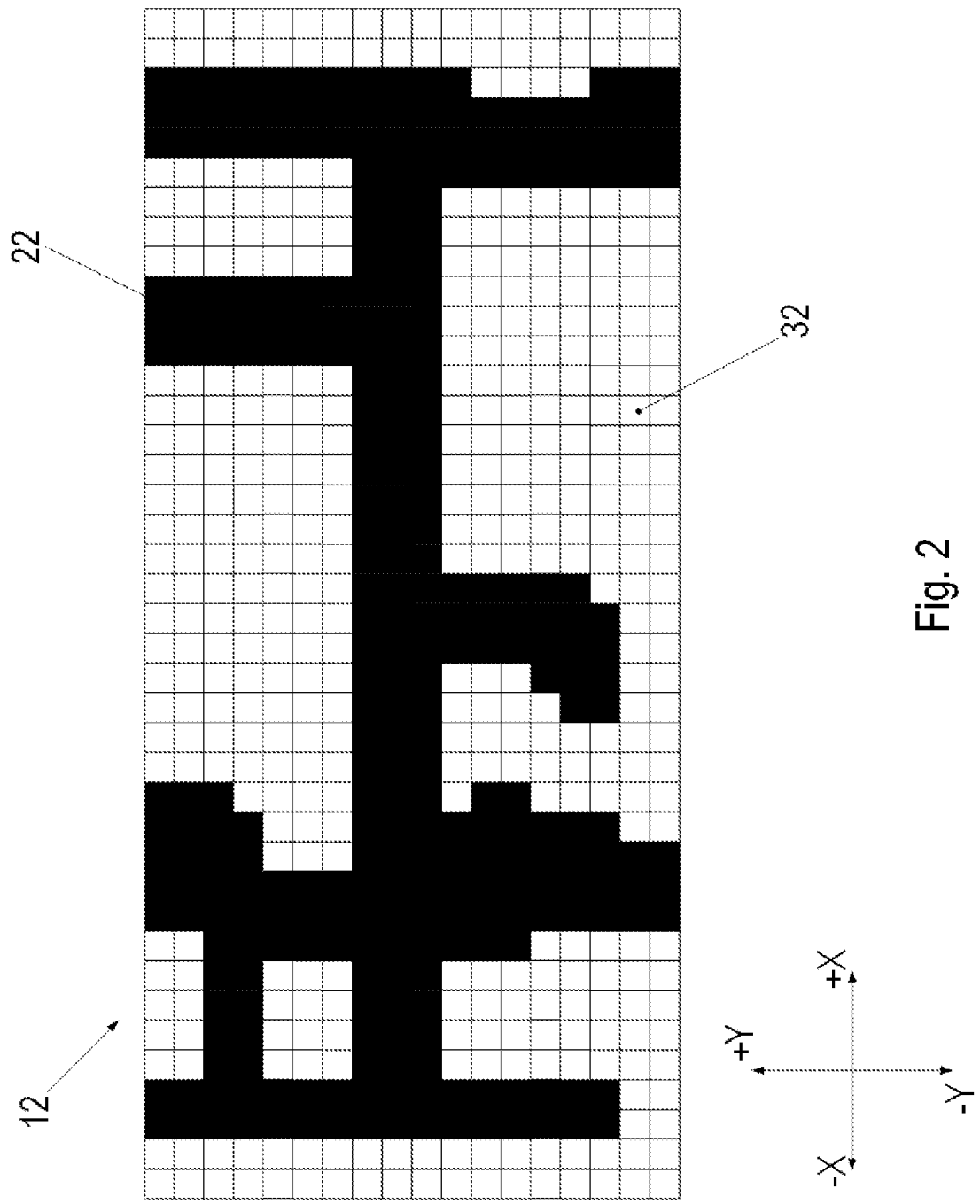
FIG. 2 illustrates the correction map illustrated in FIG. 1 in the form of a reduced grid cell map.

FIG. 2 illustrates the correction map illustrated in FIG. 1 in the form of a reduced grid cell map 12. The reduced grid cell map 12 is formed from the original grid cell map 10 in that certain free cells are characterized as occupied. In particular, the cells of the free region 22 whose distance in longitudinal direction X and/or in transverse direction Y to at least one cell of an occupied region 32 is smaller than a safe distance are characterized as occupied. Alternatively, the cells of the free region 22 are characterized as occupied when the distance in the form of a straight line to the occupied region is smaller than a safe distance. For example, the safe distance can be freely selected. In selecting the safe distance, a required distance of the mobile system from objects of the closed regions 30 and a width of the mobile system are to be taken into consideration.

Figure 3:
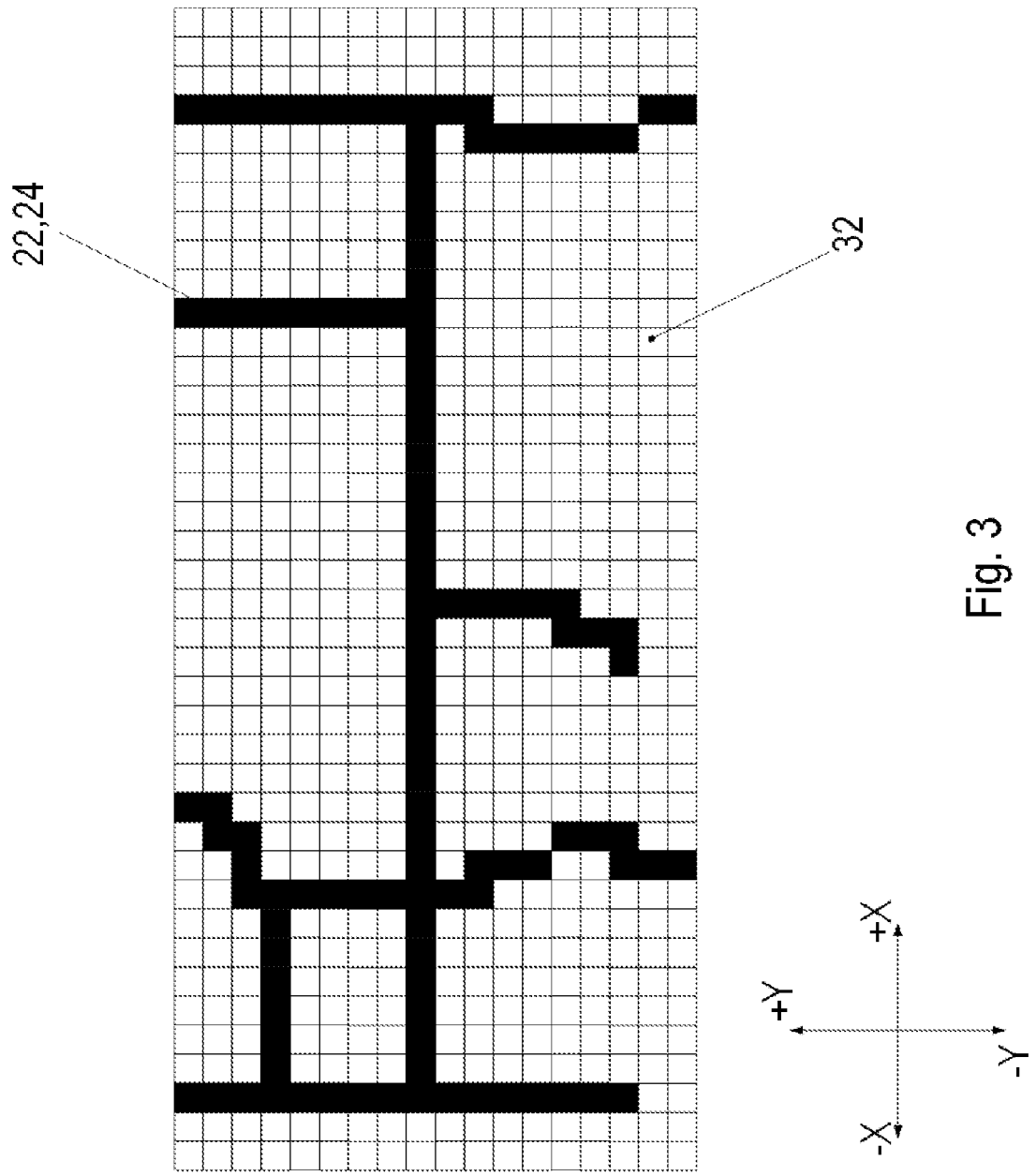
FIG. 3 illustrates the correction map illustrated in FIG. 2 with a skeleton.

FIG. 3 illustrates the correction map illustrated in FIG. 2 with a skeleton 24 of the free region 22. The skeleton 24 of the free region 22 is formed in that, starting from the reduced grid cell map 12, a thinning of the free region 22 is carried out. For example, cells of the free region 22 which in longitudinal direction X and/or in transverse direction Y adjoin an occupied region 32 are characterized as occupied. This process is continued until the free region 22 is in the form of a skeleton 24. The skeleton 24 includes only a thin, e.g., linear, sequence of individual free cells.

Figure 4:
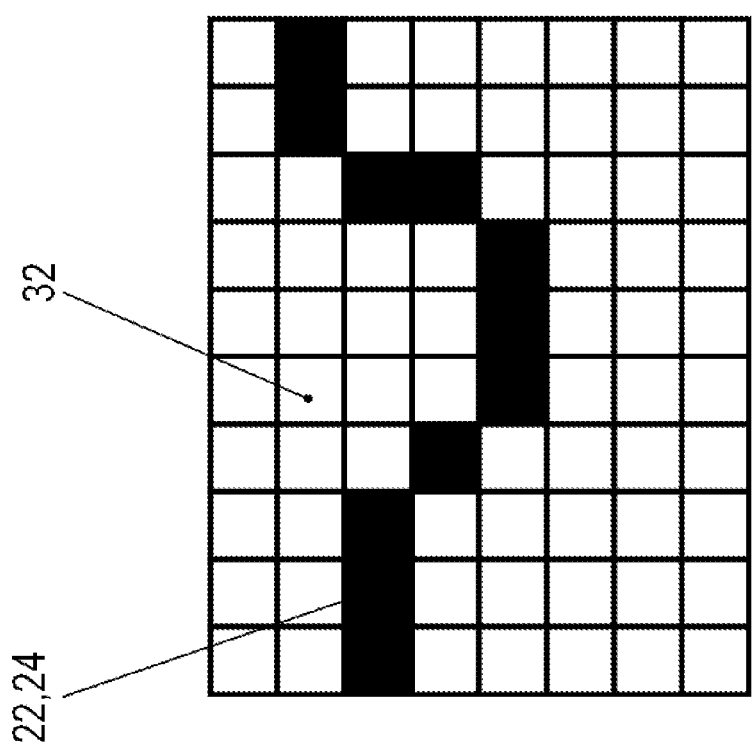
FIG. 4 illustrates a section of a skeleton before smoothing.
Figure 5:
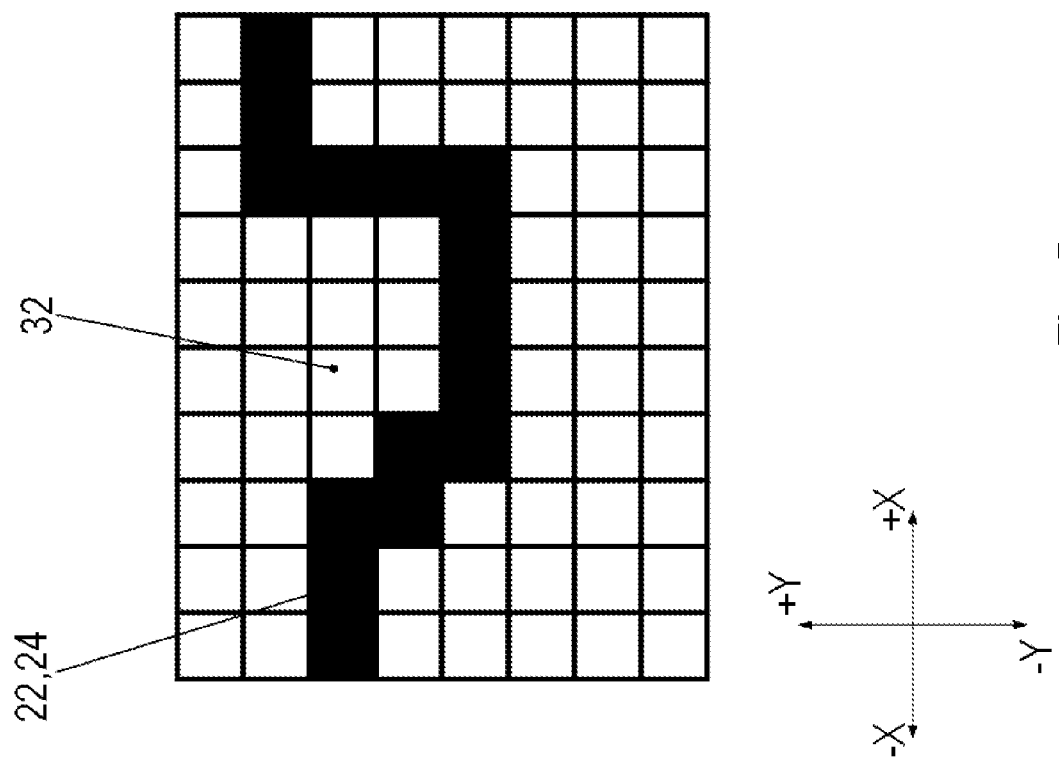
FIG. 5 illustrates the section of the skeleton illustrated in FIG. 4 after smoothing.

FIG. 4 illustrates a section of a skeleton 24 of the free region 22 before smoothing. The skeleton 24 has free cells which adjoin other free cells exclusively in diagonal direction but not in longitudinal direction X and not in transverse direction Y. Therefore, a smoothing of the skeleton 24 is carried out in that occupied cells of the occupied region 32 which in longitudinal direction X and in transverse direction Y adjoin the free region 22 are characterized as free until each cell of the free region 22 which in diagonal direction adjoins another free cell in addition adjoins in longitudinal direction X or in transverse direction Y another free cell which in longitudinal direction X or in transverse direction Y adjoins said other free cell. FIG. 5 illustrates the section of the skeleton illustrated in FIG. 4 after smoothing.

FIG. 6 illustrates a section of a skeleton 24 of a free region 22 with a curve point 43. The curve point 43 in negative longitudinal direction −X adjoins a free cell of the free region 22 and in positive longitudinal direction +X adjoins an occupied cell of the occupied region 32. In longitudinal direction X, the curve point 43 thus adjoins exactly one free cell, in which the free cell is part of a linear sequence of a minimum number of free cells in longitudinal direction X. In negative transverse direction −Y, the curve point 43 also adjoins a free cell of the free region 22 and in positive transverse direction +Y adjoins an occupied cell of the occupied region 32. Thus, in transverse direction Y, the curve point 43 adjoins exactly one free cell, in which the free cell is part of a linear sequence of a minimum number of free cells in transverse direction Y. As a value of the minimum number of free cells in longitudinal direction X as well as in transverse direction Y, the number of five cells is selected, for example.

Figure 7:
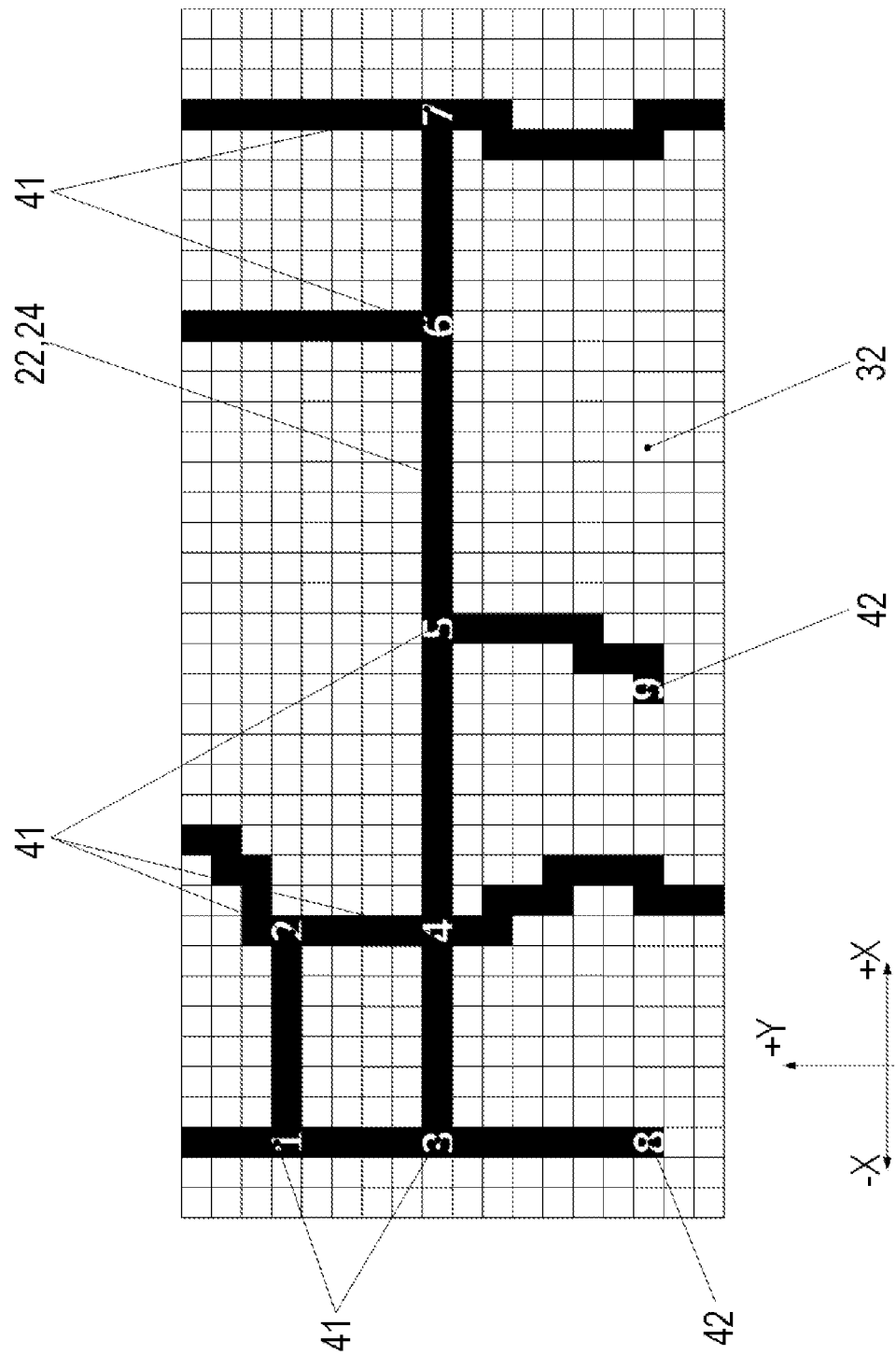
FIG. 7 illustrates a correction map of another industrial facility with a skeleton.

FIG. 7 illustrates the correction map illustrated in FIG. 3 with the skeleton 24 of the free region 22. The skeleton 24 has multiple intersections 41 and multiple end points 42. However, the skeleton 24 has no curve point 43. Intersections 41 are the cells of the free region 22 which in longitudinal direction X as well as in transverse direction Y adjoin three or four other free cells of the free region 22. End points 42 are the cells of the free region 22 which in longitudinal direction X as well as in transverse direction Y adjoin exactly one free cell of the free region 22.

All the intersections 41, all the end points 42, and, to the extent present, all the curve points 43 represent node points of a graph of the correction map, which is to be generated. The skeleton 24 includes a first node point 1, a second node point 2, a third node point 3, a fourth node point 4, a fifth node point 5, a sixth node point 6, a seventh node point 7, an eighth node point 8, and a ninth node point 9. The eighth node point 8 and the ninth node point 9 are end points 42; the remaining node points 1, 2, 3, 4, 5, 6, 7 are intersections 41.

For each node point 1, 2, 3, 4, 5, 6, 7, 8, 9, that is to say for each intersection 41, for each end point 42, and, to the extent present, for each curve point 43, connections V to other node points 1, 2, 3, 4, 5, 6, 7, 8, 9 are detected. Such a connection V includes a sequence of individual free cells between each two node points 1, 2, 3, 4, 5, 6, 7, 8, 9. Such a connection V has a connection direction R, a connection length L, and a connection width B.

For example, all the sequences of individual fee cells adjoining the respective node point 1, 2, 3, 4, 5, 6, 7, 8, 9 are passed through until an end point 42 is reached, until a curve point 43 is reached, or until an edge of the contour map is reached. For example, at a curve point 43 a significant direction change occurs. A direction change is considered to be significant if, thereafter, a linear sequence of the minimum number of free cells in the same direction follows. When a non-significant direction change is reached, the sequence of individual free cells continues to be passed through.

When an intersection 41 is reached during a passage through a sequence of individual free cells, first the connection V to this intersection 41 is detected. Subsequently, to the extent possible, starting from the intersection 41 on, a further passage through a sequence of individual free cells in the same direction occurs until the next node point 1, 2, 3, 4, 5, 6, 7, 8, 9 is reached, and the connection V to this intersection 41 is detected. All the node points 1, 2, 3, 4, 5, 6, 7, 8, 9 which can be reached from a node point 1, 2, 3, 4, 5, 6, 7, 8, 9 without significant direction change, that is to say also through another intersection 41, thus have a connection V to the node point 1, 2, 3, 4, 5, 6, 7, 8, 9.

For each connection V detected between in each case two node points 1, 2, 3, 4, 5, 6, 7, 8, 9, in each case a connection direction R, a connection length L, and a connection width B are determined. Thus, which node points 1, 2, 3, 4, 5, 6, 7, 8, 9 the currently investigated node point 1, 2, 3, 4, 5, 6, 7, 8, 9 has a connection V to and which respective connection direction R, which connection length L, and which connection width B this connection V has are retained.

Figure 8:
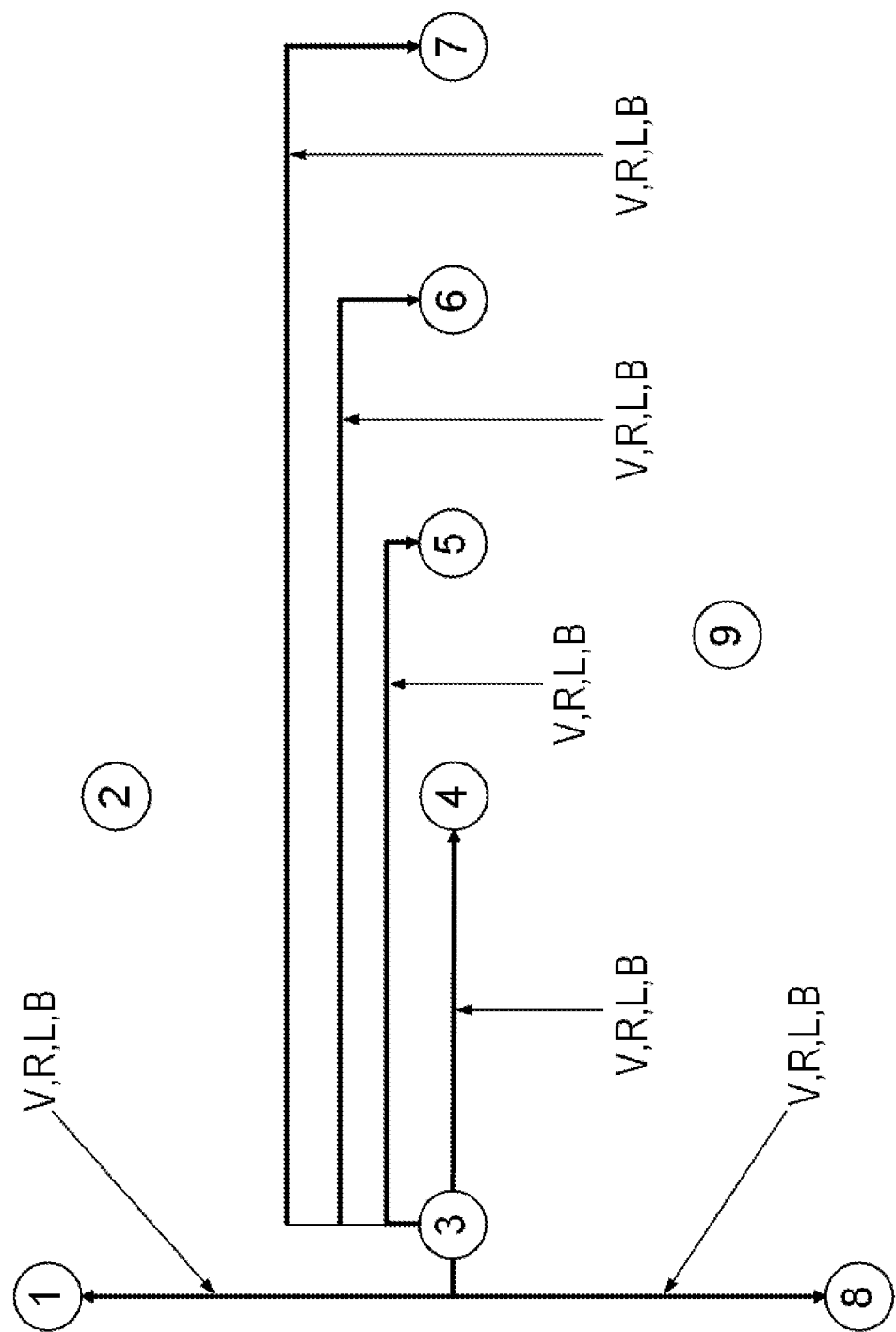
FIG. 8 illustrates a portion of a graph of the correction map illustrated in FIG. 7.

From the node points 1, 2, 3, 4, 5, 6, 7, 8, 9 and determined connections V of the skeleton 24 of the free region 22, a graph of the correction map is prepared. FIG. 8 illustrates a portion of the prepared graph of the correction map illustrated in FIG. 7. In order to increase the clarity, only the connections V associated with the third node point 3 are illustrated in the graph.

For example, the third node point 3 has connections V to the first node point 1, the fourth node point 4, the fifth node point 5, the sixth node point 6, the seventh node point 7, and the eighth node point 8. For example, the third node point 3 has no connections V to the second node point 2 and to the ninth node point 9.

Figure 9:
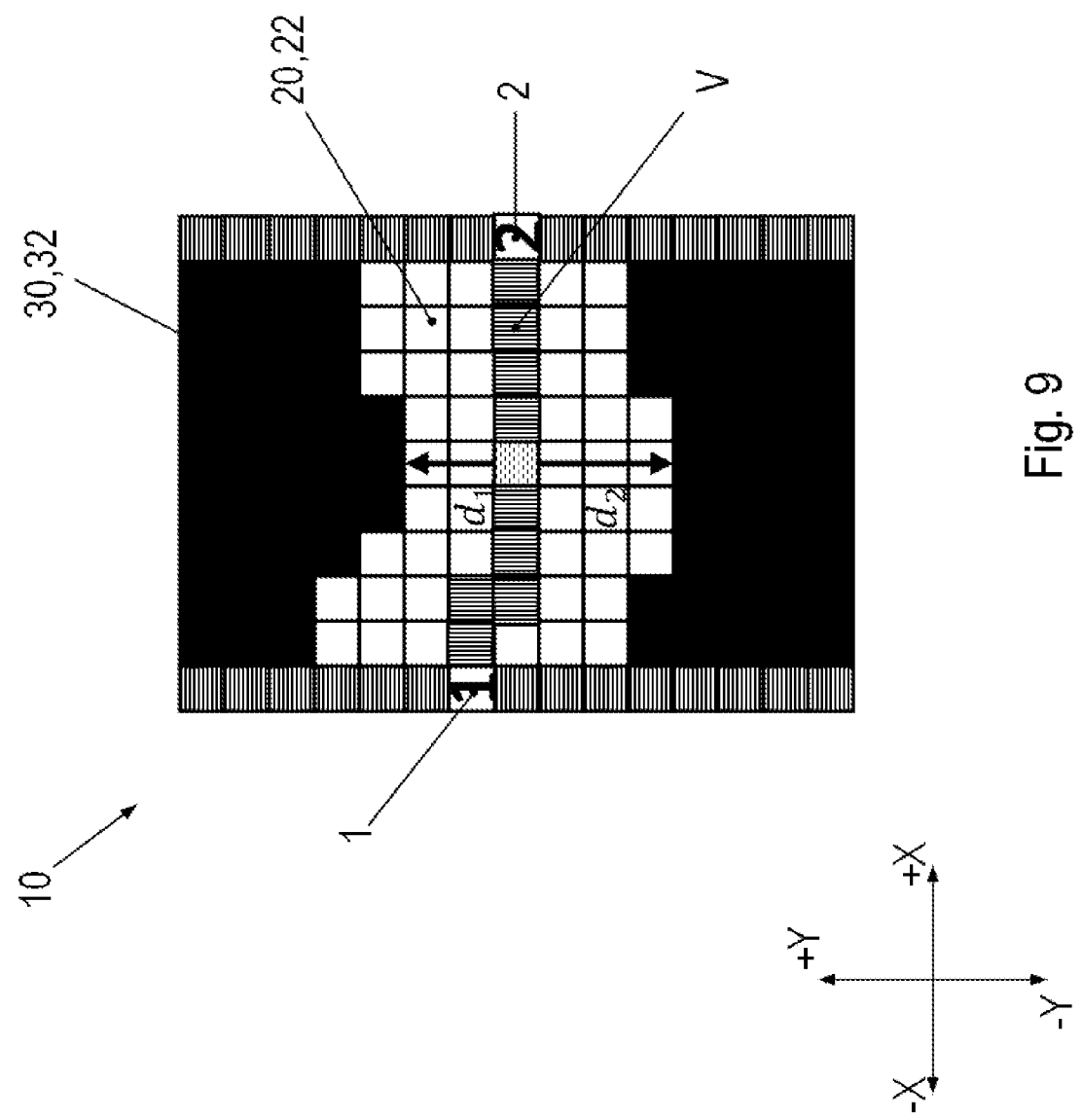
FIG. 9 illustrates the determination of connection parameters.

FIG. 9 illustrates a representation for the determination of connection parameters, namely the connection direction R, the connection length L and the connection width B of a connection V between a first node point 1 and a second node point 2, with the help of an original grid cell map 10. In the original grid cell map 10, for example, the first node point 1 has the coordinates (X1/Y1), and the second node point 2 has the coordinates (X2/Y2).

The connection length L is determined, for example, in that all the free cells passed through along the connection V between the first node point 1 and the second node point 2 are counted.

For example, the result is: L=11

Alternatively, the connection length L in the form of a straight line between the first node point 1 and the second node point 2 is determined. For example, the connection length L is calculated according to the relationship:

$$L=\sqrt{(X2-X1)^2+(Y2-Y1)^2}$$

For example, the result is: L=10.05

If a high resolution of the connection direction R is desired, the connection direction R is determined, for example, as an angle with respect to the positive longitudinal direction +X. For example, the connection direction R is calculated according to the relationship:

$$R = \operatorname{atan}\left(\frac{Y2-Y1}{X2-X1}\right)$$

For example, the result is: R=−5.7°

If a low resolution of the connection direction R is desired, the connection direction R which comes closest to the exact connection direction R, that is to say the positive longitudinal direction +X, the negative longitudinal direction −X, the positive transverse direction +Y or the negative transverse direction −Y, is associated with the connection direction.

For example, the result is: R=+X

For the determination of the connection width B, for example, from each free cell of the connection V, a first connection distance d1, in a direction perpendicular to the connection direction R, to the closest closed region 30 is determined, and a second connection distance d2, in an opposite direction perpendicular to the connection direction R, to the closest closed region 30 is determined. A path width, which is calculated as the sum of the two determined connection distances d1, d2, is associated with the free cell. The connection width B is determined as the smallest path width of all the free cells of the connection V.

For example, the result is: B=5

LIST OF REFERENCE CHARACTERS

1 First node point
2 Second node point
3 Third node point
4 Fourth node point
5 Fifth node point
6 Sixth node point
7 Seventh node point
8 Eighth node point
9 Ninth node point
10 Original grid cell map
12 Reduced grid cell map
20 Vehicle-accessible region
22 Free region
24 Skeleton
30 Closed region
32 Occupied region
41 Intersection
42 End point
43 Curve point
V Connection
R Connection direction
L Connection length
B Connection width
d1 First connection distance
d2 Second connection distance
X Longitudinal direction
+X Positive longitudinal direction
−X Negative longitudinal direction
Y Transverse direction
+Y Positive transverse direction
−Y Negative transverse direction

The invention claimed is:
1. A method for operating an industrial facility including at least one mobile system, the industrial facility including a vehicle-accessible region and a closed region, comprising:
generating a base map of the industrial facility including information about the vehicle-accessible region and the closed region;
generating a correction map of the industrial facility including information about the vehicle-accessible region and the closed region;
overlaying the base map with the correction map; and
replacing at least one metric feature of the base map by a metric feature of the correction map in response to a difference between a metric feature of the base map and a metric feature of the correction map being detected;

wherein the base map and the correction map are each generated as a graph that describes the vehicle-accessible region, the graph includes a first node point, a second node point, and a connection between the first node point and the second node point as topological features, the connection has a connection direction and a connection length, and the graph of the base map is overlaid with the graph of the correction map.

2. The method according to claim 1, wherein the base map of the industrial facility has information about at least one planned route for the at least one mobile system, the correction map of the industrial facility has information about at least one planned route for the at least one mobile system, the base map is overlaid with the correction map, and at least one parameter of the at least one planned route of the base map is transferred to a corresponding planned route of the correction map.

3. The method according to claim 1, wherein, in the overlaying of the graph of the base map with the graph of the correction map, the connection length and a difference of the connection directions between corresponding node points are used.

4. The method according to claim 3, wherein the graph includes at least one intersection as a node point, and the graph is generated in that the cells of the free region which in the longitudinal direction and in the transverse direction adjoin at least three other free cells are characterized as intersections, for each of the intersections, connections to other node points are detected, a connection includes a sequence of individual free cells between two node points, and for each connection detected, a connection direction and a connection length are determined.

5. The method according to claim 1, further comprising
initially incorporating the correction map and/or the base map as an original grid cell map that extends in a longitudinal direction and a transverse direction perpendicular to the longitudinal direction and that has a plurality of individual cells;
characterizing the cells that describe the vehicle-accessible region as free, the free cells forming a free region;
characterizing the cells that describe the closed region as occupied, the occupied cells forming an occupied region;
generating, from the original grid cell map, a reduced grid cell map;
characterizing the cells of the free region of the original grid cell map whose distance in the longitudinal direction and/or in the transverse direction and/or in a straight line to at least one cell of the occupied region is smaller than a safe distance as occupied;
performing a thinning of the free region of the reduced grid cell map;
characterizing the cells of the free region that in the longitudinal direction and/or in the transverse direction adjoin at least one occupied region as occupied, until the free region is in the form of a skeleton that includes at least one linear sequence of individual free cells; and
generating, from the skeleton of the free region, the graph of the correction map and/or of the base map.

6. The method according to claim 5, wherein, before generating the graph of the correction map and/or of the base map, a smoothing of the skeleton of the one free region is performed, and the cells of the occupied region which in the longitudinal direction and in the transverse direction adjoin the free region are characterized as free, until each cell of the free region which in a diagonal direction adjoins another free cell additionally in the longitudinal direction or in the transverse direction adjoins another free cell which in the longitudinal direction or in the transverse direction adjoins the other free cell.

7. The method according to claim 5, wherein, in the reduced grid cell map, at least one charging point for charging the mobile system is provided, and the thinning of the free region of the reduced grid cell map is performed such that the charging point is part of the skeleton.

8. The method according to claim 7, wherein the graph includes at least one charging point as a node point, and the graph is generated in that, for each of the charging points, connections to other node points are detected, a connection includes a sequence of individual free cells between two node points, and for each connection detected, a connection direction and a connection length are determined.

9. The method according to claim 1, wherein the graph includes at least one end point as a node point, and the graph is generated in that the cells of the free region which in the longitudinal direction and in the transverse direction adjoin exactly one free cell are characterized as end points, for each of the endpoints, connections to other node points are detected, a connection includes a sequence of individual free cells between two node points, and for each connection detected, a connection direction and a connection length are determined.

10. The method according to claim 1, wherein the graph includes at least one curve point as a node point, and the graph is generated in that the cells of the free region which in the longitudinal direction adjoin exactly one free cell that is part of a linear sequence of a minimum number of free cells in the longitudinal direction, and which in the transverse direction adjoin exactly one free cell that is part of a linear sequence of a minimum number of free cells in the transverse direction, are characterized as curve points, for each of the curve points, connections to other node points are detected, a connection includes a sequence of individual free cells between two node points, and for each connection detected, a connection direction and a connection length are determined.

11. The method according to claim 1, wherein a connection has a connection width, and the graph of the correction map and/or of the base map is generated in that, in addition to each connection detected, a respective connection width is determined in that, from each free cell of the connection, on both sides, a respective connection distance, in a direction perpendicular to the connection direction, to the respective closest closed region is determined, a path width, which is calculated as a sum of the two determined connection distances, is associated with the free cell, and the connection width is determined to be a smallest path width of all the free cells of the connection.

12. The method according to claim 1, wherein for each connection detected, the respective connection direction is determined in that a principal direction which comes closest to an exact connection direction is associated with the connection direction.

13. The method according to claim 1, wherein the mobile system includes a pick-up for contactless reception of energy, and the industrial facility has at least one charging point for inductive transfer of energy, the pick-up adapted to inductively couple to the charging point, and the charging point is arranged at a node point.

14. The method according to claim 1, wherein the mobile system includes a pick-up for contactless reception of energy, and the industrial facility has at least one conductor loop for inductive transfer of energy, the pick-up adapted to inductively couple to the conductor loop, and the conductor loop is arranged along a connection between two node points.

15. The method according to claim 1, wherein the mobile system includes a pick-up for contactless reception of energy, and the industrial facility has at least one charging point for inductive transfer of energy, the charging point being arranged at a node point, the method further comprising inductively coupling the pick-up to the charging point.

16. The method according to claim 1, wherein the mobile system includes a pick-up for contactless reception of energy, and the industrial facility has at least one conductor loop for inductive transfer of energy, the conductor loop being arranged along a connection between two node points, the method further comprising inductively coupling the pick-up to the conductor loop.

17. The method according to claim 16, further comprising moving the mobile system on the connection between the two node points.

18. The method according to claim 17, further comprising charging an energy storage of the mobile system via the inductive coupling during movement of the mobile system on the connection between the two node points.

19. The method according to claim 1, wherein the mobile system includes an autonomous driving vehicle.

20. The method according to claim 19, further comprising transporting objects within the industrial facility by the autonomous driving vehicle.

21. The method according to claim 1, wherein the vehicle-accessible region includes an empty area and/or a path, and the closed region includes an assembly station of the industrial facility and/or a work bench of the assembly station.

\* \* \* \* \*